(12) United States Patent
Homann

(10) Patent No.: US 10,076,852 B2
(45) Date of Patent: Sep. 18, 2018

(54) METHOD FOR MANUFACTURING A FIBREBOARD

(71) Applicant: GCE Deutschland GmbH, Losheim am See (DE)

(72) Inventor: Fritz Homann, Munich (DE)

(73) Assignee: GCE DEUTSCHLAND GMBH, Losheim am See (DE)

( * ) Notice: Subject to any disclaimer, the term of this patent is extended or adjusted under 35 U.S.C. 154(b) by 0 days.

(21) Appl. No.: 15/655,060

(22) Filed: Jul. 20, 2017

(65) Prior Publication Data

US 2018/0021977 A1   Jan. 25, 2018

(30) Foreign Application Priority Data

Jul. 21, 2016   (EP) .................................... 16001607

(51) Int. Cl.
| | | |
|---|---|---|
| *B27N 3/12* | (2006.01) | |
| *B27N 3/18* | (2006.01) | |
| *B27N 5/00* | (2006.01) | |
| *B29C 43/22* | (2006.01) | |
| *B29C 43/46* | (2006.01) | |

(Continued)

(52) U.S. Cl.
CPC ................. *B27N 3/06* (2013.01); *B27N 3/04* (2013.01); *B27N 3/12* (2013.01); *B27N 3/18* (2013.01); *B27N 5/00* (2013.01); *B29C 43/226* (2013.01); *B31F 1/20* (2013.01); *B32B 3/28* (2013.01); *B32B 5/26* (2013.01); *B32B 21/02* (2013.01); *B32B 38/10* (2013.01); *D21J 1/04* (2013.01); *D21J 1/16* (2013.01); *B27N 3/08* (2013.01);

(Continued)

(58) Field of Classification Search
CPC ... B27N 3/04; B27N 3/08; B27N 3/10; B27N 3/12; B27N 3/18; B27N 3/24; B27N 3/26; B27N 5/00; B29C 43/226; B29C 2043/463; B32B 3/28; B32B 21/02; B32B 21/042; B32B 21/13; B32B 2307/72; B29L 2016/00
See application file for complete search history.

(56) References Cited

U.S. PATENT DOCUMENTS 3,216,059 A * 11/1965 Voelskow ................ B27N 3/24
                                                                      425/147
5,932,156 A *  8/1999 Eriksson .................. B27N 3/24
                                                                      264/101

(Continued)

FOREIGN PATENT DOCUMENTS

| DE | 9333110 C | * | 9/1955 |
|---|---|---|---|
| DE | 2364025 A1 | | 6/1975 |
| DE | 4342789 A1 | | 6/1995 |
| DE | 10153175 A1 | | 5/2003 |
| EP | 0004999 B1 | | 5/1982 |
| EP | 1110687 B1 | | 12/2005 |

(Continued)

OTHER PUBLICATIONS van Dam et al.; "Production for high density high performance Binderless boards from whole coconut hush" Bs. 20, No. 1, Jul. 1, 2014.

*Primary Examiner* — Michael A Tolin
(74) *Attorney, Agent, or Firm* — Harness, Dickey & Pierce, P.L.C.

(57) ABSTRACT

The disclosure proposes a fiberboard made of lignocellulose-containing fibers, in particular wood fibers and a binding agent for providing a fiberboard which enables to combine a high stability, on the one hand, and a comparatively small weight, on the other hand, and which can nevertheless be manufactured with a minor financial effort.

13 Claims, 2 Drawing Sheets

(51) Int. Cl.
  *B32B 3/28* (2006.01)
  *B32B 21/02* (2006.01)
  *B32B 38/10* (2006.01)
  *B27N 3/06* (2006.01)
  *B27N 3/04* (2006.01)
  *B31F 1/20* (2006.01)
  *B32B 5/26* (2006.01)
  *D21J 1/04* (2006.01)
  *D21J 1/16* (2006.01)
  *B29L 16/00* (2006.01)
  *B27N 3/08* (2006.01)
  *C08L 97/02* (2006.01)

(52) U.S. Cl.
  CPC ..... *B29C 2043/463* (2013.01); *B29L 2016/00* (2013.01); *C08L 97/02* (2013.01)

(56) References Cited

U.S. PATENT DOCUMENTS

| | | | | |
|---|---|---|---|---|
| 6,136,239 | A * | 10/2000 | Lundgren | B27N 3/18 264/101 |
| 6,364,982 | B1 * | 4/2002 | Lynch | B27N 3/08 156/196 |
| 8,297,027 | B2 * | 10/2012 | Noble | B32B 3/10 52/783.11 |
| 2008/0197536 | A1 | 8/2008 | Fujii | |
| 2013/0284357 | A1 | 10/2013 | Noble | |
| 2015/0004371 | A1 * | 1/2015 | Noble | E04C 2/3405 428/178 |

FOREIGN PATENT DOCUMENTS

| | | |
|---|---|---|
| GB | 1129457 A | 10/1968 |
| GB | 2261845 B | 6/1995 |

\* cited by examiner

Figur 1
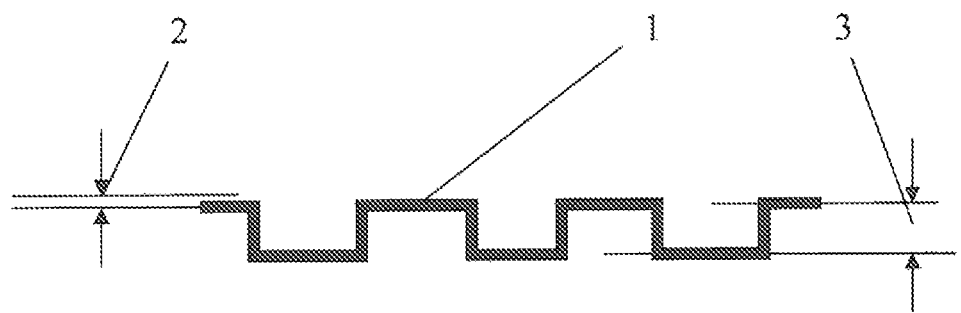
Figur 2
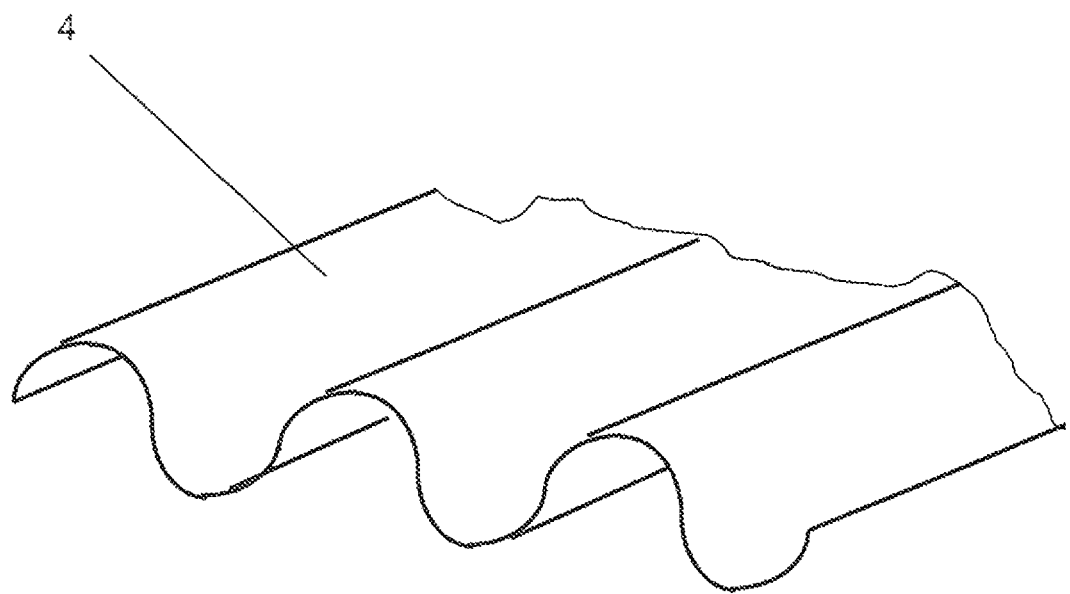

Figur 3
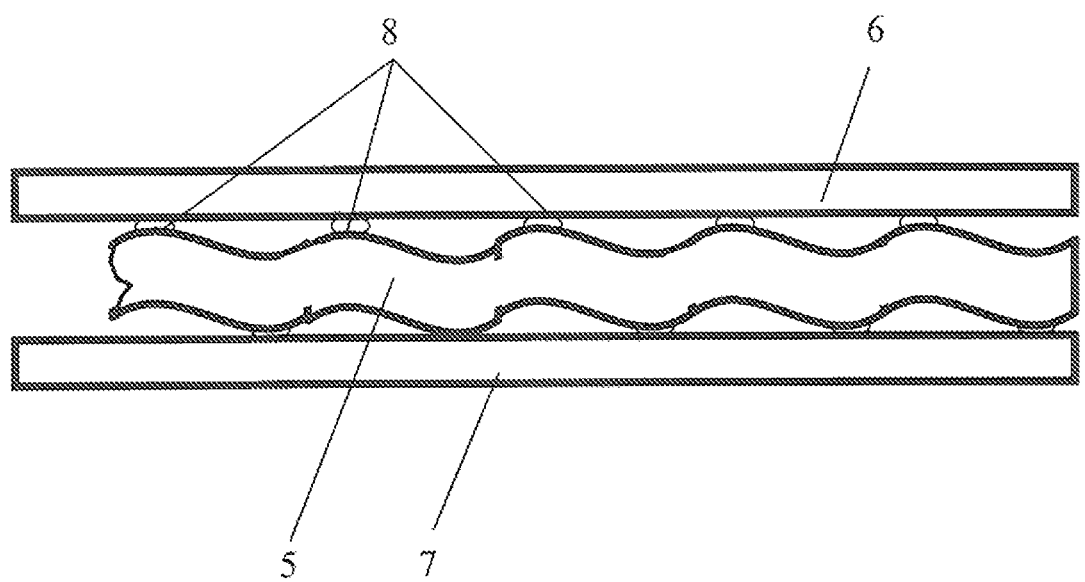

METHOD FOR MANUFACTURING A FIBREBOARD

FIELD

The present disclosure relates to a fibreboard as well as a method for manufacturing the same one.

Furthermore, the application discloses a device for manufacturing corresponding fibreboards.

BACKGROUND

Fibreboards made of lignocellulose-containing fibres, in particular wood fibres, as such, as well as methods for manufacturing these ones are known by themselves from the state of the art, such that no reference has to be made to specifications at this point.

A medium density fibreboard, MDF board for short, is typically a board made of a wood fibre material. According to the relevant European norm the average raw density of a MDF board is comprised between 650 kg/m$_3$ and 800 kg/m$_3$. Boards having a medium raw density of more than 800 kg/m$_3$ are designated as high density fibreboards (HDF) and those having a medium raw density of less than 650 kg/m$_3$ are designated as light MDF. In case of a medium raw density of less than 550 kg/m$_3$ one speaks of ultralight MDF.

Typically, medium density fibreboards and also ultralight MDF boards are manufactured by the so called dry process. According to this process, glued and dry fibres are produced by means of the so called blow line gluing, which fibres comprise a humidity content of less than 12% atro, wherein alternative gluing methods are known from the state of the art. Alternative gluing methods are for example the blender gluing and the dry fibre gluing. After a gluing of the fibres, another drying operation will be alternatively or optionally carried out. From the state of the art the use of so called multi-component fibres, for example bi-component fibres, is known. These are fibres with different glue components which can be for example activated by means of temperature.

The dry and glued or blended fibres will then be distributed for example by a spreader to form a mat. For this purpose, a transport belt will be typically used, onto which the spreader will scatter the fibres. In a last process step the formed mat will be pressed and the binding agent will harden by means of heat input. Usually this is carried out on continuously or discontinuously operating hot presses.

The board band manufactured in the above described manner can then be trimmed and cut to length as requested to form individual boards.

The above described procedure is sufficiently known from the state of the art.

GB 1 129 457 relates to laminated systems. GB 2 261 845 relates to a moulded part made of a mixture of resin and curing agent. US 2008/0197536 A1 discloses a moulded part made of wood fibres. These ones are generated from a dried pre-formed intermediate product. This specification does explicitly not disclose any information about the dimensioning with respect to the product height and the board thickness. No board is formed, but a dried mixture is directly introduced into a mould and cured there. DE 23 64 025 relates to mixtures of an elastomer and fibres for manufacturing moulded parts, wherein a pre-mixture is formed as fibreboard, i.e. an intermediate product. EP 0 004 999 relates to the manufacture of highly profiled moulded parts from pre-fabricated and slightly compressed fibreboards which are suitable for deep-drawing. EP 1 110 687 relates to the manufacture of light fibreboards. Deformations or other details are not disclosed here. DE 10153175 describes an installation for manufacturing boards from nonwovens, wherein a décor is manufactured in a compression moulding process for producing profiled tubular door skins. US 2013/0284357 discloses honeycomb panels and honeycomb systems. It discloses for example to cut a pre-fabricated corrugated plate into strips and to form honeycombs therefrom. It also discloses to cure masses which have been fabricated into undulated plates in moulds. This is a compression moulding process for moulded products. DE 43 42 789 discloses a method for manufacturing moulded parts from a sliding layer mat that can be hot pressed, which mat is generated by folding individual layers of fibre fleece on top of each other.

An improved procedure has been known from EP 1 110 687 B2. The here described method relates to the production of light fibreboards having an average raw density comprised between 60 and 350 kg/m$_3$ which are used as heat insulating boards in the building sector. Herein, the particularity of the described method is the fact that a raw density profile is formed, wherein an increase of the raw density at the border of at least 20% with respect to the average raw density of the fibreboard is obtained. This is achieved procedurally in that the cover side of the mat will be sprinkled with water before a pressing operation. As a result a light fibreboard is obtained which comprises, with respect to its large surface, border areas, the density of which is higher by at least 20% than the average raw density. These border areas typically comprise a thickness comprised between 0.2 mm and 0.5 mm.

It is furthermore known to manufacture corresponding boards, in particular ultralight MDF boards in the form of sandwich boards. Herein external layers are made of a first fibre/binding agent mixture and intermediate areas are made of a second fibre/binding agent mixture. Thus, boards can be produced which are simplified with respect to their handling, treatment and further processing.

The known boards of most different types are used for very different purposes, mats as insulating materials, HDF boards for filling up, sheathing, covering and the like. The known mats and boards however comprise very different mechanical properties due to their different densities and production parameters. There is a need for as light boards as possible which are nevertheless extremely stable, but it has not been possible hitherto to cover this demand satisfactorily. Either the boards are mechanically highly resistant, for which they are usually provided with a massive raw density due to a high compression and thus they are heavy, or they are more lightweight and correspondingly less stable. It has been tried to find a remedy for this by combining materials. But there are limitations related to the process technology and the manufacturing machines.

SUMMARY

Based upon the above described state of the art, it is an object of the disclosure to provide a fibreboard which allows combining a high stability, on the one hand, with a comparatively low weight, on the other hand, and which can be simultaneously manufactured with little expense.

Concerning a device, this aim is achieved by proposing a fibreboard comprising the characteristics of claim 1. Other advantages and features are disclosed in the sub-claims.

According to the disclosure a fibreboard made of lignocellulose-containing fibres, in particular wood fibres and a binding agent is proposed, wherein this fibreboard comprises an inherently stable three-dimensional deformation which extends into at least one direction and periodically recurs.

The fibreboard according to the disclosure is a plate-shaped moulded body which consists of lignocellulose-containing fibres. It is essentially plate-shaped. While a usual board can be essentially designated as a cuboid provided with flat surfaces, which cuboid is defined by side edges and two external surfaces, which surfaces are placed in a plane defined by the side edges, three-dimensional deformation in the sense of the present disclosure means that the board itself is deformed into a direction perpendicular to the side edges while the surfaces are essentially parallel to each other. In the simplest imaginable case these deformations can be simple structures, for example pyramids. A three-dimensional deformation however comprises bends, angles, pores and the like.

Inherently stable in the sense of the present disclosure means that after its manufacture the board will remain mechanically stable in its deformed state, i.e. it will not be flexible in the sense that the deformation could be removed. It may comprise a certain elasticity, but it is solid enough such that it will maintain its deformed shape.

Extending into at least one direction and periodically recurring however means that the deformation will permanently continue and recur along one of the board directions. A board can thus be undulated or it can comprise angles or the like. If a cross section is taken along a direction of the board, such that the deformation can be regarded from the side, this one shows a kind of wave, a saw tooth, a rectangular profile or the like.

The deformation can extend obliquely with respect to the side edges, which is a result from designing. Principally, it can also be so designed as to extend in parallel with one of the side edges.

According to an advantageous proposal, the board will be designed as HDF board with respect to the raw density. It preferably contains long fibres which are for example 15 through 20 mm long.

Thanks to the design of the fibreboard according to the disclosure a board is produced which fills a great volume with respect to its raw density. Spatial volume in the sense of the present disclosure designates the essentially cuboid space which is filled by the board. While the raw density or the board volume refer to the solid substance of the board, the spatial volume is formed in that flat surfaces on the uppermost and lowest projections of the deformed board are complemented by circumferential side edges to form a cuboid which completely encloses the board. This cuboid comprises a volume which is clearly greater than the volume which is formed by the solid substance of the board itself. According to an advantageous proposal of the disclosure, the board thickness will be exceeded at least by the factor 3 by the volume amount.

A particular advantage of the board according to the disclosure is that it combines higher mechanical properties with a small bulk density. Thanks to the deformation which is produced, the board will become mechanically more stable in itself. It is generally known that curved or buckled elements are particularly stable along the bending axis, if a pressure is exerted. But in the present case, the board is also extremely stable and break-proof in the direction of deformation due to its raw density.

The board according to the disclosure has the advantage of considerably enlarging the application fields of such boards. Due to its small weight in comparison to the bulk density such a board can be for example used as filling. Such application fields are for example found in the manufacture of doors and wall elements. Due to its mechanical strength the surface can be opened up by drilling and it can retain screws. It can also retain nails.

It can be directly provided with so called edgings, i.e. strips which are glued onto the side edges or otherwise fastened thereto. Due to the three-dimensional deformation the board offers a considerable fastening surface on the side edges.

The boards can also be used within the scope of sandwich structures. They can be connected to similar, three-dimensionally deformed boards by placing those ones on top of each other and can be fixed to each other in whatever manner. Herein, it is an advantage to arrange the three-dimensional deformations in an angular manner to each other. If two identical boards comprising for example a wave contour are connected to each other, they can be put on top of each other perpendicularly to one another. In this manner, a plurality of contact points and a considerable spatial volume with a simultaneously very small board weight are obtained. The mechanical stability is tremendous.

According to another advantageous proposal of the disclosure, flat boards can be put onto the surface of three-dimensionally deformed boards according to the disclosure. In this manner, boards which are very light with respect to the spatial volume but extremely stable are obtained, if the flat cover boards are for example very thin HDF boards.

Concerning the method, the disclosure proposes a method comprising the features of claim 9. Other advantages and features are disclosed in the sub-claims.

At first according to the disclosure, like in the state of the art, a predetermined quantity of a dried fibre/binding agent mixture will be distributed on a forming belt. Usually the weight is determined there and the scattered material will be compressed until a predetermined amount is reached. While at this point in the state of the art, the form cake is introduced into long pressing lines, in which it is heated up and finally cured in an oven, the method according to the disclosure shifts these steps to a deformation process.

For activating the binding agents which are usually introduced into the mixture in form of bi-component or multi-component fibres an activation temperature and, where appropriate, a basic moisture level is required. Herein, the basic moisture usually is also the carrier of the thermal treatment.

After the activation the deformation will take place in the deforming station, which will be immediately followed by the curing.

In an especially advantageous manner, the fibre cake will be treated with vapour shortly before reaching the deforming station, whereby the binding agents will be activated. In the following deforming station, the curing will directly take place in the deformed condition.

According to an advantageous proposal of the disclosure, this process step will be carried out between a pair of rollers. The disclosure however also includes alternative solutions. Thus, only one roller can work on a mat surface, whereas the opposite surface is pushed forward on a flat ground. It is also possible to push a mat forward on a flat ground and to deform at least one surface by periodically impressing it in a vertical direction by means of a matrix, a beam or the like.

Rollers according to the disclosure can comprise surfaces which are designed such that they deform the fibre cake in a corresponding manner. The rollers are heated, for which purpose very different methods can be used. The rollers can be electrically heated, be filled with hot oil, can comprise combinations thereof and they can be combined with supplementary external treatment sources such as for example UV radiation, IR radiation and the like, gas burners etc. It is essential that the deformation is realized in the activated fibre cake between the rollers and will be maintained by an immediate curing. Depending on the plant technology it may make sense to use separating agents in order to prevent the fibre cake from sticking to the working surfaces.

According to an advantageous proposal, the manufacture which starts with thinning out the fibre cake by scattering the fibre mixture and finishes with the curing of the board is a continuous process.

According to an advantageous proposal, the manufacture will be followed by a confectioning process.

An essential aspect of the present disclosure is the provision of a new and inventive forming station for the manufacture of corresponding fibreboards. According to the disclosure, the forming station comprises a pair of rollers for deforming and curing an activated fibre cake. This pair of rollers at least includes one roller which is heated in the above described manner, wherein both rollers comprise surfaces that are designed such that they can impress the desired deformation into the fibre cake. Herein, the term roller in the sense of the present disclosure has to be broadly defined, since these ones can also be short belt units.

The fibreboard according to the disclosure cures after a very short treatment with heat and moisture. Once deformed, its shape remains stable. It does not require any webs and can always be reproduced. Furthermore, the fibreboard is resource-saving and can be recycled. More than 80% of the components are of organic nature. The board can be manufactured with formaldehyde-free binding agents and due to its high inherent stability it can also be used without any frame in contrast to other lightweight constructions. Owing to the construction it can comprise a higher stability than comparable full material products, but it fills a great volume with simultaneously a small weight. Furthermore, the board can be provided with a smooth homogenous surface, such that it can be directly coated or laminated with different materials.

Depending on the application case, the fibreboard according to the disclosure is particularly suitable for constructing sandwich products. Fibreboards of the same kind can thus be put on top of each other. If these ones are arranged at angles with respect to each other, a compound having a great volume and comprising two slightly deformed fibreboards will be created. Flat boards can also be placed on top. This kind of panelling leads to very stable elements. These ones can be for example used as door leaves and the like. While in the state of the art one usually applies a gluing over the entire surface in the case of honeycomb constructions and the like for producing sandwich compounds, because the glue is usually sprayed on, the disclosure proposes to apply glue only onto a minimum contact area between adjacent boards. It is imaginable to grind wave peaks flat and afterwards to apply glue onto the wave peaks for example by means of a roller, a slim syringe, a mask or the like, in order to produce a bonding with another corrugated board or a flat board. This minimum gluing leads to the result that not the entire plates are covered by a film. There are less evaporations, a smaller weight and the material properties of the fibreboard material can show their effectiveness.

DRAWINGS

The disclosure provides an innovative fibreboard as well as an innovative manufacturing method which enable to manufacture fibreboards, which comprise a particular mechanical stability with simultaneously a small weight with respect to the spatial volume, with a manageable economic effort by means of an innovative manufacturing unit. Other advantages and features of the disclosure will become apparent from the following description by means of the figures. Herein:

FIG. 1 shows a schematic side view of a fibreboard according to the disclosure;

FIG. 2 shows a perspective partial view of a fibreboard according to the disclosure and FIG. 3 shows a schematic side view of a sandwich board.

DESCRIPTION

FIG. 1 shows a fibreboard 1 which comprises a progressing rectangular wave structure in the shown exemplary embodiment. As explanation the dimensioning of the board thickness 2, on the one hand, and the dimensioning of the board height 3, on the other hand, are shown. The board height is together with the circumference of the board the measure for calculating the spatial volume of the board. It becomes clear that a very great spatial volume can be obtained by means of an inherently very stable thin board 1 which only comprises the thickness 2.

FIG. 2 schematically shows a board 4 having an essentially sinusoidal deformation progress.

It is obvious that these boards, either in a sandwich construction or as single boards, comprise a high mechanical strength with simultaneously a small bulk density.

As the representation of a sandwich board in FIG. 3 shows, both surfaces of a corrugated and deformed board 5 according to the disclosure will be laminated with two flat boards 6 and 7. Contact lines result along the wave groups. The areas designated with 8 are connection areas, in which glue is applied. The peaks of the boards 5 can be flattened before, for example by grinding them flat. The glue can be applied onto the connection areas 8 by means of a roller, by linear spraying, by means of a mask or the like. The sandwich compound is formed by subsequent pressing. Corresponding connection areas are similarly formed in the area of the lower flat board.

The described exemplary embodiments only serve for explanation and are not limiting.

What is claimed is:

1. A method for manufacturing a fibreboard, comprising:
   distributing and pre-compressing a predetermined quantity of dried lignocellulose-containing fibres and a binding agent on a forming belt;
   activating the binding agent by introducing heat and moisture into the quantity of lignocellulose-containing fibres and the binding agent;
   supplying the lignocellulose-containing fibres and binding agent to a forming station;
   engaging a roller positioned in the forming station with the lignocellulose-containing fibres and activated binding agent to deform the quantity of fibres and binding agent into a shaped fibreboard; and
   curing the activated binding agent within the forming station.

2. The method according to claim 1, wherein the method starting with distributing and ending with curing is a continuous process.

3. The method according to claim 1, wherein the heat and moisture are introduced immediately before the deforming and curing operations.

4. The method according to claim 1, wherein the deforming and curing operations are realized simultaneously.

5. The method of claim 1, wherein the fibreboard comprises an inherently stable three-dimensional deformation which extends into at least one direction and periodically recurs.

6. The method of claim 5, wherein the deformation extends obliquely to a side edge of the fibreboard.

7. The method of claim 6, wherein the fibreboard is a laminate including an additional fibreboard layer.

8. The method of claim 7, wherein the deformations are arranged at angles with respect to additional deformations on the additional fibreboard.

9. The method of claim 1, wherein a ratio of a thickness of the fibreboard with respect to its volume is at least 1:3.

10. The method of claim 1, wherein the fibreboard is a laminate including a flat board layer.

11. A method for manufacturing a fibreboard, comprising:
   distributing and pre-compressing a predetermined quantity of dried lignocellulose-containing fibres and a binding agent on a forming belt;
   activating the binding agent by introducing heat and moisture into the quantity of lignocellulose-containing fibres and the binding agent;
   supplying the lignocellulose-containing fibres and binding agent to a forming station;
   deforming the lignocellulose-containing fibres and binding agent to form a first layer having waves with peaks;
   flattening the peaks; and
   gluing a second layer to the flattened peaks.

12. The method of claim 11, wherein flattening the peaks includes grinding portions of the first layer.

13. The method of claim 12, wherein the second layer includes a flat board.

\* \* \* \* \*